(12) United States Patent  
Yamori et al.

(10) Patent No.: US 8,144,776 B2  
(45) Date of Patent: Mar. 27, 2012

(54) DIRECT MODE VIDEO CODING USING VARIABLE SELECTION CRITERION

(75) Inventors: Akihiro Yamori, Kawasaki (JP); Akira Nakagawa, Kawasaki (JP); Kiyoshi Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1582 days.

(21) Appl. No.: 11/460,260

(22) Filed: Jul. 27, 2006

(65) Prior Publication Data

US 2007/0217510 A1   Sep. 20, 2007

(30) Foreign Application Priority Data

Mar. 15, 2006   (JP) .................................. 2006-070813

(51) Int. Cl.  
*H04N 7/12* (2006.01)
(52) U.S. Cl. ................................................. 375/240.16
(58) Field of Classification Search .............. 375/240.16  
See application file for complete search history.

(56) References Cited

U.S. PATENT DOCUMENTS

| | | |
|---|---|---|
| 2004/0001546 A1 | 1/2004 | Tourapis et al. |
| 2005/0141612 A1 | 6/2005 | Abe et al. |
| 2005/0185713 A1 | 8/2005 | Winger et al. |
| 2008/0063075 A1 | 3/2008 | Kondo et al. |

FOREIGN PATENT DOCUMENTS

| | | |
|---|---|---|
| CN | 1471320 A | 1/2004 |
| CN | 1685732 A | 10/2005 |
| EP | 1 406 453 | 4/2004 |
| EP | 1 562 385 | 8/2005 |
| GB | 2 413 721 | 11/2005 |
| JP | 2004-208259 | 7/2004 |
| JP | 2004-215229 | 7/2004 |

OTHER PUBLICATIONS

Japanese Office Action mailed on Mar. 9, 2010 in corresponding Japanese Patent Application 2006-070813.

Thomas Wiegand et al., "Draft ITU-T Recommendation H.264 & Final Draft International Standard 14496-10 AVC" Joint Video Team (JVT) of ISO/IEC MPEG & ITU-T VCEG, Mar. 13, 2004. Retrieved from the Internet: URL: http://ip.hhi.de/imagecom_G1/assets/pdfs/JVT-G0t0.pdf Retrieved on Jan. 3, 2007.

(Continued)

*Primary Examiner* — Jay Patel  
*Assistant Examiner* — Richard Torrente  
(74) *Attorney, Agent, or Firm* — Staas & Halsey LLP (57) ABSTRACT

The present invention provides a video coding method which includes, as one of a plurality of coding modes, a direct mode generating a piece of motion information of each of Macro Blocks, which are obtained by dividing a first picture, by predicting from motion information of a coded Macro Block of other plurality of second pictures, including: a first step for selecting the direct mode as the coding mode by using a variable selection criterion; and a second step for coding the Macro Blocks based on the selected coding mode.

7 Claims, 11 Drawing Sheets

OTHER PUBLICATIONS

Alexis Michael Tourapis et al. "Direct Mode Coding for Bipredictive Slices in the H.264 Standard", IEEE Transactions on Circuits and Systems for Video Technology, vol. 15, No. 1, Jan. 2005, pp. 119-126.

Hideaki Kimata et al., "Spatial Temporal Adaptive Direct Mode Coding on Bidirectional Motion Compensation Prediction", Systems and Computers in Japan, vol. 35, No. 14, Dec. 2004, pp. 1-9.

European Search Report, mailed Jan. 31, 2007, and issued in corresponding Japanese Patent Application No. 06254015.8-2223.

Chinese Office Action issued on Mar. 6, 2009 in corresponding Chinese Patent Application 200610115967.X.

Korean Office Action issued May 22, 2009 in corresponding Korean Patent Application 10-2006-81222.

"ITU-T H.264, Series H, Audiovisual and Multimedia Systems, Infrastructure of audiovisual services—Coding of moving video", International Telecommunication Union, Mar. 2005.

PRIOR ART

FIG. 8

PRIOR ART

F I G. 9

PRIOR ART

F I G. 1 0

PRIOR ART

FIG. 11

DIRECT MODE VIDEO CODING USING VARIABLE SELECTION CRITERION

BACKGROUND OF THE INVENTION

1. Field of the Invention

The present invention relates to a video coding method, a video coding apparatus and a video coding program, e.g., and to a technique effectively applicable to a video coding by referring to a plurality of pictures.

2. Description of the Related Art

Requirements for a reduction of a data volume and an improvement of an image quality for the transmission and accumulation of video image information are all the more increasing in association with a wide range development of digitalization of video images.

In response to such demands, H.264/Advanced Video Coding (AVC) for example are in a spotlight as so-called next generation video coding technique.

In the next generation video coding, a prediction method for each Macro Block (MB) of Bi-predictive Picture (B-Picture) has largely five methods, i.e., an intra-image prediction, a forward prediction, a backward prediction, a bi-directional prediction and a direct mode.

Among them, the direct mode is a method for determining a motion vector of the current Macro Block from a motion vector of a Macro Block which is adjacent time-wise and space-wise by focusing on a continuity of a video.

The direct mode heightens a temporal-spatial relationship of a motion vector and contributes to an improvement of a motion prediction and of an information volume compression ratio because a transmission of motion vector information of the current Macro Block is not required.

Meanwhile, a coding of a Bi-directional prediction Picture (B-Picture) basically adopts one picture from the forward direction and one picture from the backward direction as reference picture in a conventional video coding such as MPEG2.

Comparably, the H.264/AVC can use either three or more reference pictures, and it is able to select two from the forward direction or two from the backward direction even if there are only two reference pictures. It also enables a reference to a B-Picture per se as reference picture, as opposed to the conventional method in which another picture cannot refer to the B-Picture.

Now the description is of a temporal direction direct mode as one of direct modes. Although the direct mode is one not requiring a transmission of motion vector information of the current Macro Block as already described, a motion vector of a temporal direct mode then selects, as a reference vector (a "mvCol" hereinafter), a motion vector of a Macro Block at the same position (a "co-location Macro Block" hereinafter) as a picture processed in the immediate past and determines a vector from the vector by a ratio of time distance. That is, when considering a B-Picture of a specific place as the basis in a common sequence of a video coding, the B-Picture is processed after a reference picture in the forward direction (i.e., in the time past direction) and one in the backward direction (i.e., in the time future direction), and therefore the picture processed in the immediate past becomes a future picture.

Figure 8:
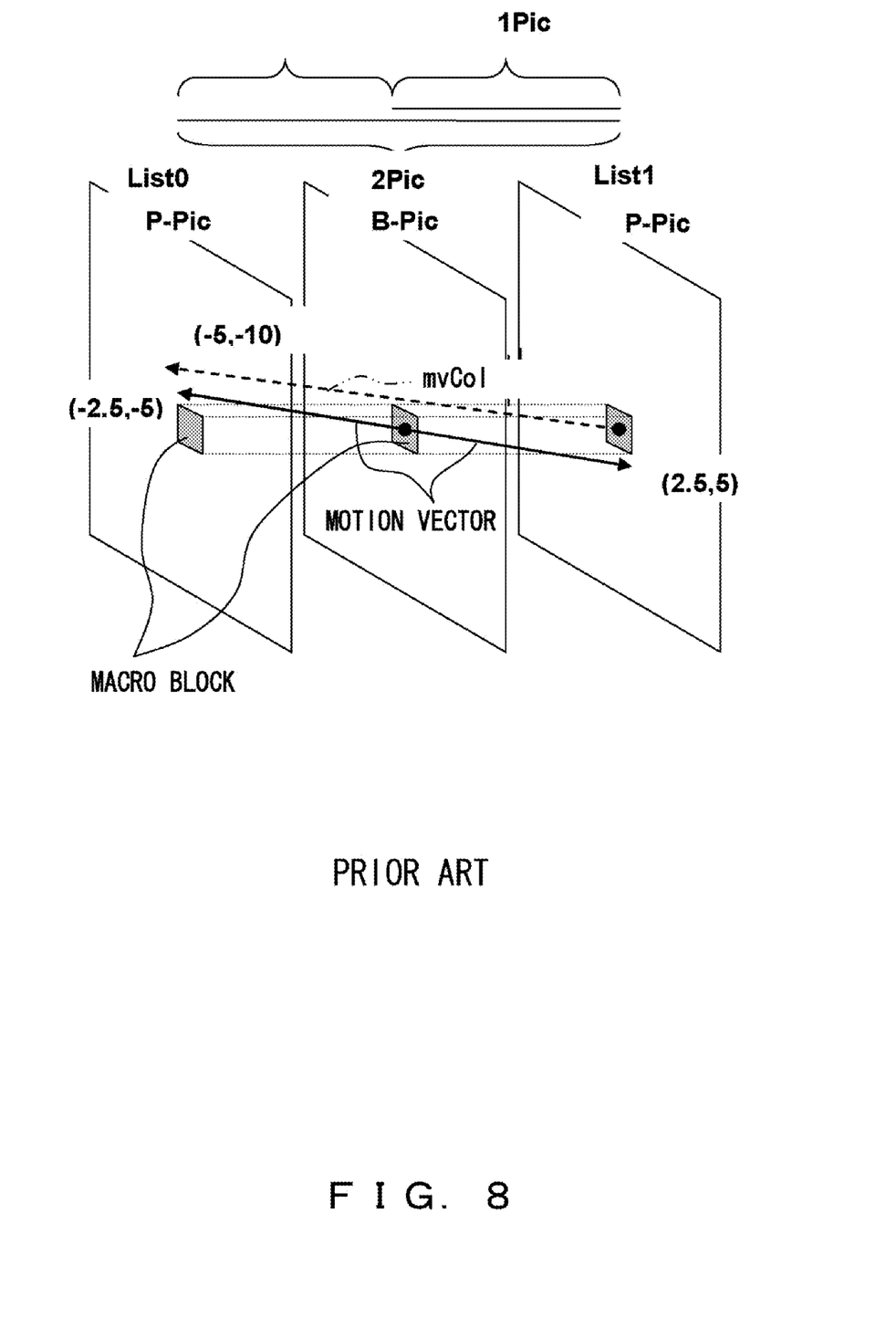
FIG. 8 is a conceptual diagram exemplifying a generation of a motion vector of a temporal direct mode.

FIG. 8 exemplifies a motion vector of a temporal direct mode. As shown in FIG. 8, if a mvCol is (−5, −10) between two pictures (Pic), a direct mode vector of the B-Pic drawing on the left is a motion vector of the temporal direct mode with a half the size of the mvCol in both the forward and backward directions, the forward direction being (−2.5, −5) in the same direction and the backward direction being (2.5, 5) in the opposite direction.

Note that, if there are two B-Pics or if a B-Pic has a Field structure comprising a plurality of Fields corresponding to a jump scan, a weighting changes with the time allocation.

A reference picture in the past direction is generally called List0, and one in the future direction is called List1.

A direct vector is generated by a scaling according to a time distance with a motion vector of the co-location Macro Block of a picture (which is called a Co-located picture; simply "Col-Pic") of Reference_Index=0 of the List1 as mvCol.

Figure 9:
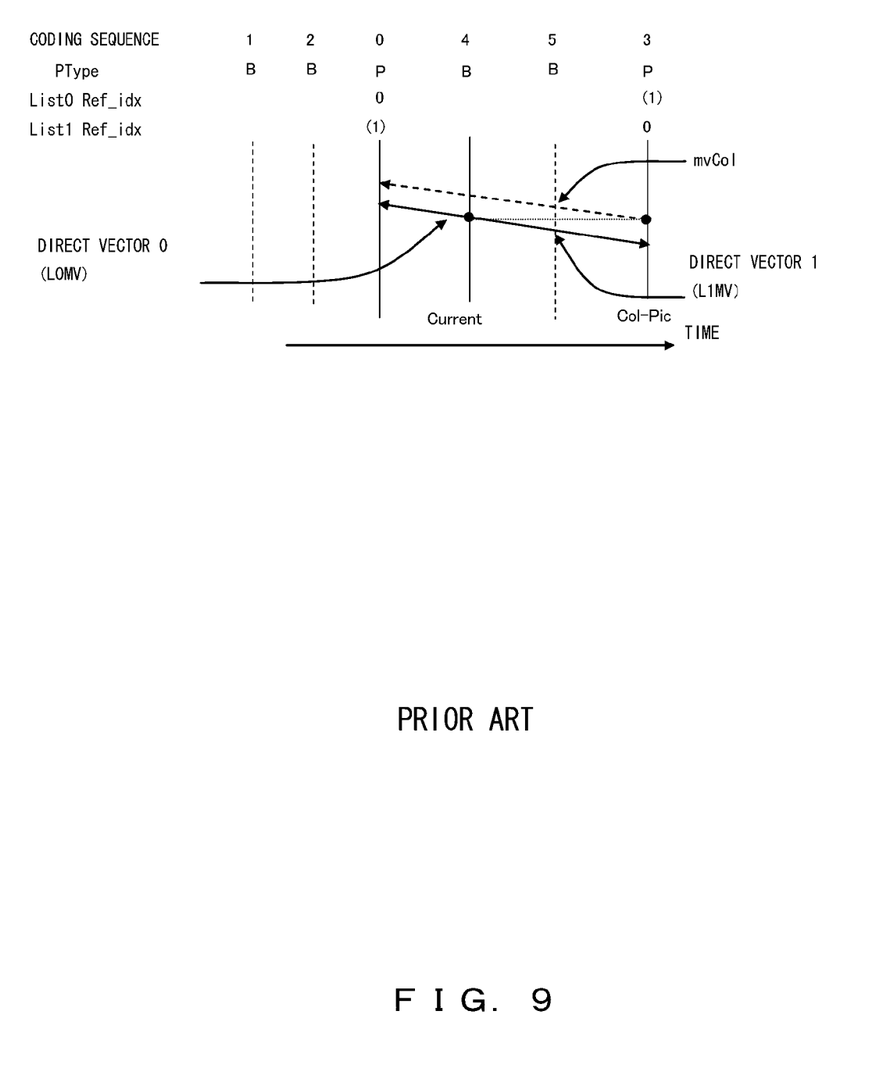
FIG. 9 is a conceptual diagram exemplifying a generation of a direct vector in the case of a Frame structure corresponding to a sequential scan.
Figure 10:
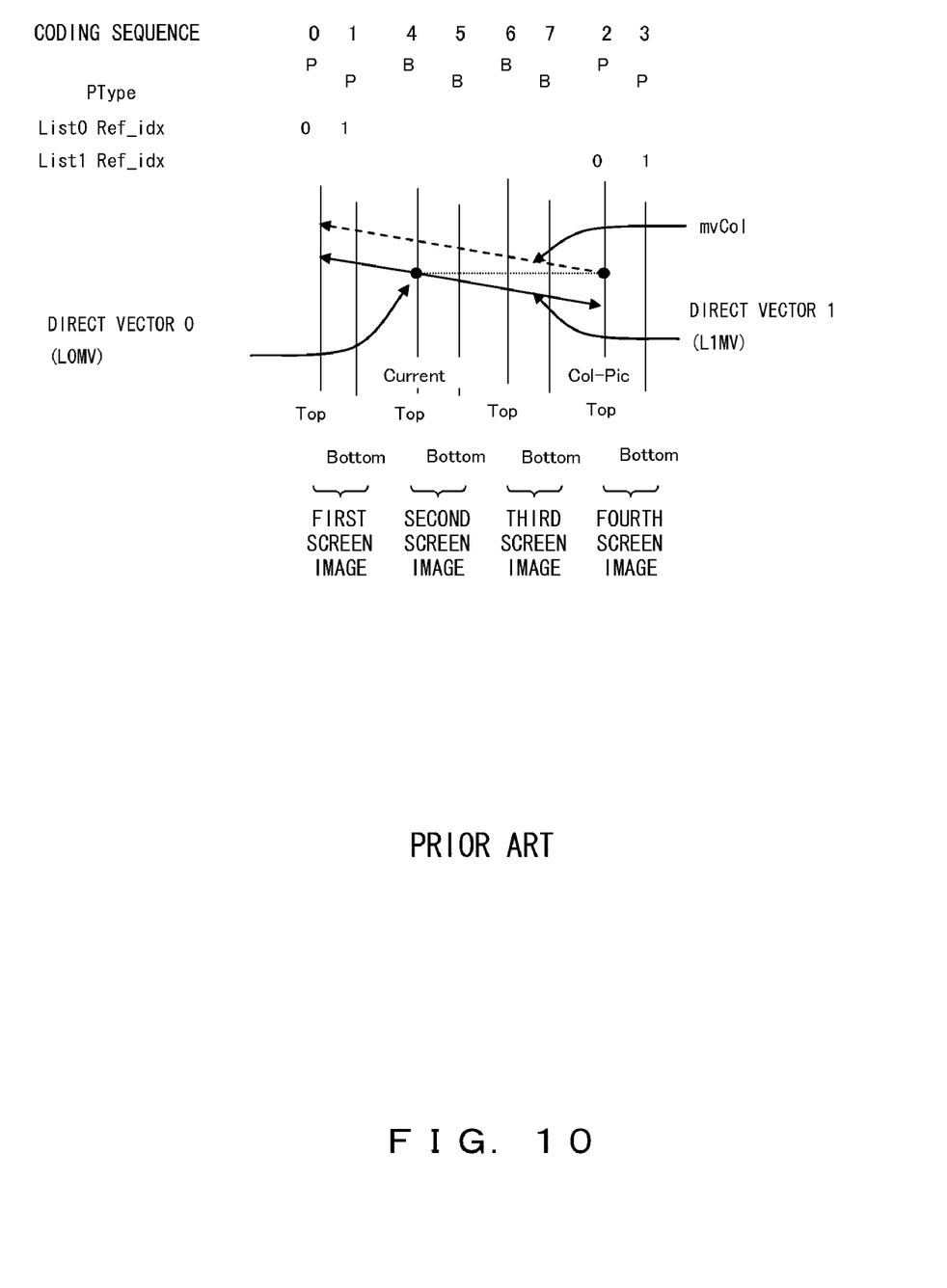
FIG. 10 is a conceptual diagram exemplifying a generation of a direct vector in the case of a Field structure corresponding to a jump scan.

FIG. 9 exemplifies a direct vector in the case of a Frame structure corresponding to a sequential scan; and FIG. 10 exemplifies a direct vector in the case of a Field structure corresponding to a jump scan.

In the case of reference pictures List0 and List1 being separated between the forward and backward directions time-wise from a view of the current frame, a motion vector of the direct mode is generated according to a scaling of a temporal-direction distance (i.e., an internal division of the mvCol) with the motion vector of the co-location Macro Block of the List1 as mvCol if the motion vector of each Macro Block of the List1 indicates the List0 as reference picture.

However, in the case of both of the List0 and List1 being in the same direction from the view of the current picture, or a motion vector indicating a opposite parity (i.e., a different Field) within the same frame by a field structure coding, or a B-Picture becoming a reference frame, then the mvCol may possibly become a motion vector which does not straddle the current frame. In this case, the motion vector of the direct mode is calculated by an external division of the mvCol.

Figure 11:
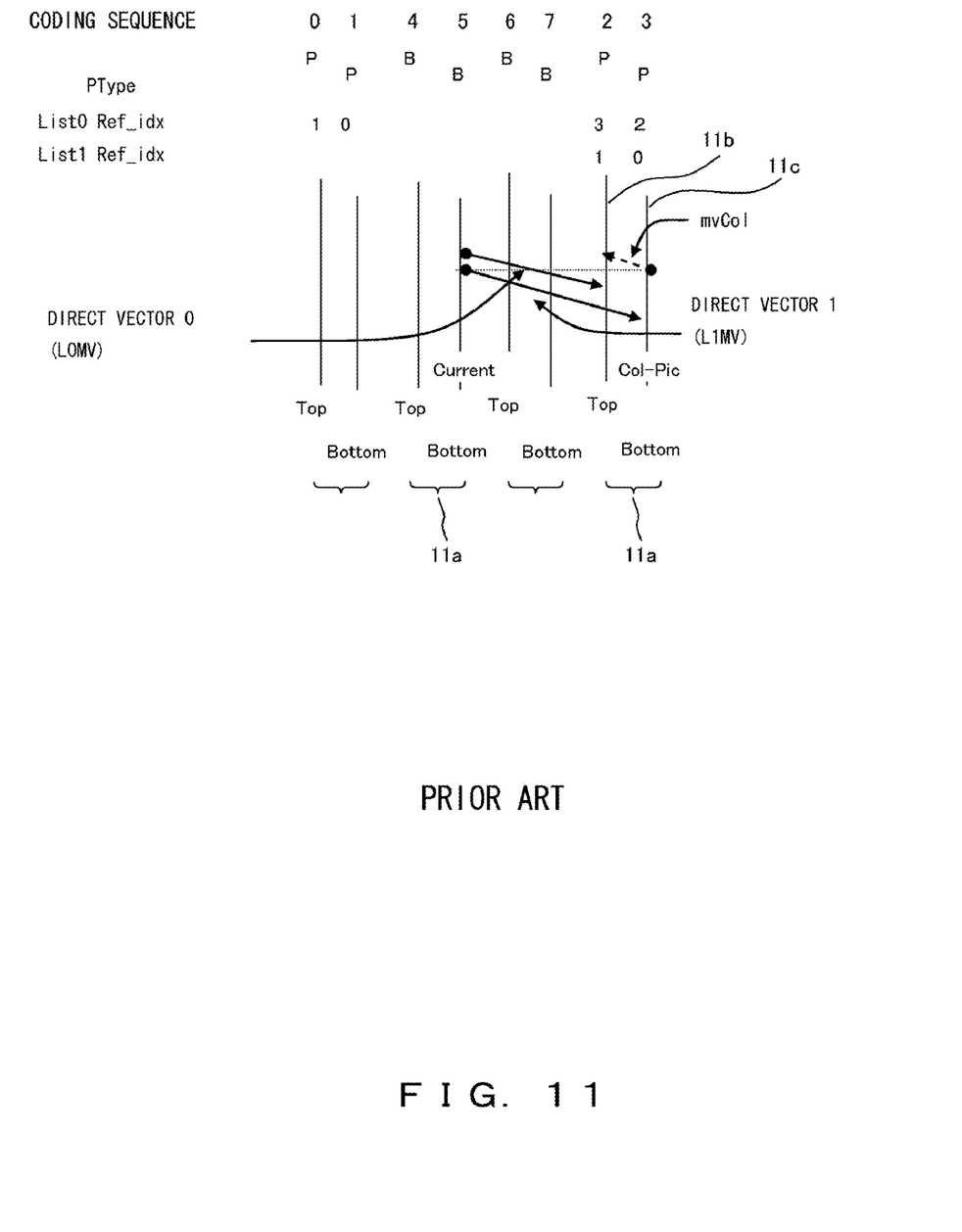
FIG. 11 is a conceptual diagram showing a technical problem at the time of generating a direct vector in the case of a Field structure corresponding to a jump scan.

FIG. 11 exemplifies the case of calculating a direct vector by an external division of the mvCol, as a concrete example.

The example shown in FIG. 11 is in the case of a Field structure, and yet the example shown in FIG. 11 can apply to the case of Frame structure in a case such as B-Picture becoming a reference picture. In this case, a direct vector 0 (L0MV) and a direct vector 1 (L1MV) are external divisions of the mvCol, and therefore they are degraded in terms of vector accuracy. The L1MV can only be expressed in four times coarser accuracy as compared to the MV in the example shown in FIG. 11.

Here, the operation of calculating a motion vector of the direct mode by an external division and generating a motion vector with a larger component than a mvCol depending on a case can only generate a motion vector of which an accuracy is a half-pel (i.e., one half of a pixel) accuracy for a vector becoming two times, and an integer (i.e., a unit pixel) accuracy for the vector becoming four times even if a mvCol is a motion vector of a quarter-pel (i.e., a quarter of a pixel) accuracy for example, and accordingly there is a possibility of the degraded accuracy of the motion vector causing a degraded prediction efficiency.

Meanwhile, in the case of a Field structuring carrying out a coding by the unit of a field of an input video image, the common method of taking two reference pictures each in the forward and backward directions causes a shortage in the number of ref_idx, resulting in a failure to generate a motion vector of a temporal direct mode.

A patent document 1 has disclosed a technique comprising a judgment unit for judging whether or not a scaling process for obtaining a motion vector in the case of a temporal direct mode for coding a video, and, if the scaling process is judged to be impossible, carrying out a motion compensation either by using another coding mode or not performing a scaling process.

The technique disclosed by the patent document 1, however, discards the temporal direct mode in the case of being unable to carry out the scaling process, and therefore is faced with a risk of being unable to effectively utilize an improvement of compression efficiency by adopting the temporal direct mode.

[Patent document 1] Laid-Open Japanese Patent Application Publication No. 2004-215229

SUMMARY OF THE INVENTION

A purpose of the present invention is to accomplish an improvement of compression efficiency by a direct mode without causing a degradation of an image quality in a video coding.

Another purpose of the present invention is to accomplish an improvement of prediction efficiency, coding efficiency and resultant compression efficiency by adopting a direct mode without being influenced by a scanning system of a video in a video coding.

Yet another purpose of the present invention is to accomplish a further improvement of prediction efficiency, coding efficiency and resultant compression efficiency as a result of adopting a direct mode by increasing a frequency of selecting a direct mode in a video coding.

A first aspect of the present invention is to provide a video coding method which includes, as one of a plurality of coding modes, a direct mode generating a piece of motion information of each of Macro Blocks, which are obtained by dividing a first picture, by predicting from motion information of a coded Macro Block of other plurality of second pictures, including: a first step for selecting the direct mode as the coding mode by using a variable selection criterion; and a second step for coding the Macro Blocks based on the selected coding mode.

A second aspect of the present invention is to provide a video coding apparatus which includes, as one of a plurality of coding modes, a direct mode generating a piece of motion information of each of Macro Blocks, which are obtained by dividing a first picture, by predicting from motion information of a coded Macro Block of another plurality of second pictures, including: a mode selection unit having a variable selection criterion in the case of selecting the direct mode as the coding mode; and a coding unit for carrying out a coding of the Macro Blocks based on the selected coding mode.

A third aspect of the present invention is to provide a signal carrying a video coding program for making a computer execute, as one of a plurality of coding modes, a direct mode generating a piece of motion information of each of Macro Blocks, which are obtained by dividing a first picture, by predicting from motion information of a coded Macro Block of other plurality of second pictures, wherein the program makes the computer execute a first step for selecting the direct mode as the coding mode by using a variable selection criterion; and a second step for carrying out a coding of the Macro Blocks based on the selected coding mode.

The above described present invention makes it possible to avoid a selection of a mvCol degrading accuracy and prevent an inability of selecting a temporal direct mode in the case of a video screen being a Field structure in a direct mode which is supposed to fundamentally improve prediction efficiency and/or coding efficiency.

That is, relating to a selection of the direct mode for a B-Picture, the present invention primarily is contrived to change the mvCol by changing a picture as the target of a reference, enable a selection of a temporal direct mode as much as possible and improve prediction efficiency because an inability of selecting the temporal direct mode largely reduces a coding efficiency.

Secondly, it is contrived to comprise means for judging whether or not a List0 and a List1, i.e., reference pictures, exist biased to the forward or backward direction when viewed from the current picture and suppress a selection of the temporal direct mode from the direct modes if both of them exist in one direction from the view of the current picture.

The method for suppressing the temporal direct mode may include one for not selecting it at all, or one for allowing a selection of the direct mode only when a mvCol indicates a small motion of a component close to a zero vector.

DESCRIPTION OF THE PREFERRED EMBODIMENTS

The following is a detailed description of the preferred embodiment of the present invention by referring to the accompanying drawings.

Figure 1:
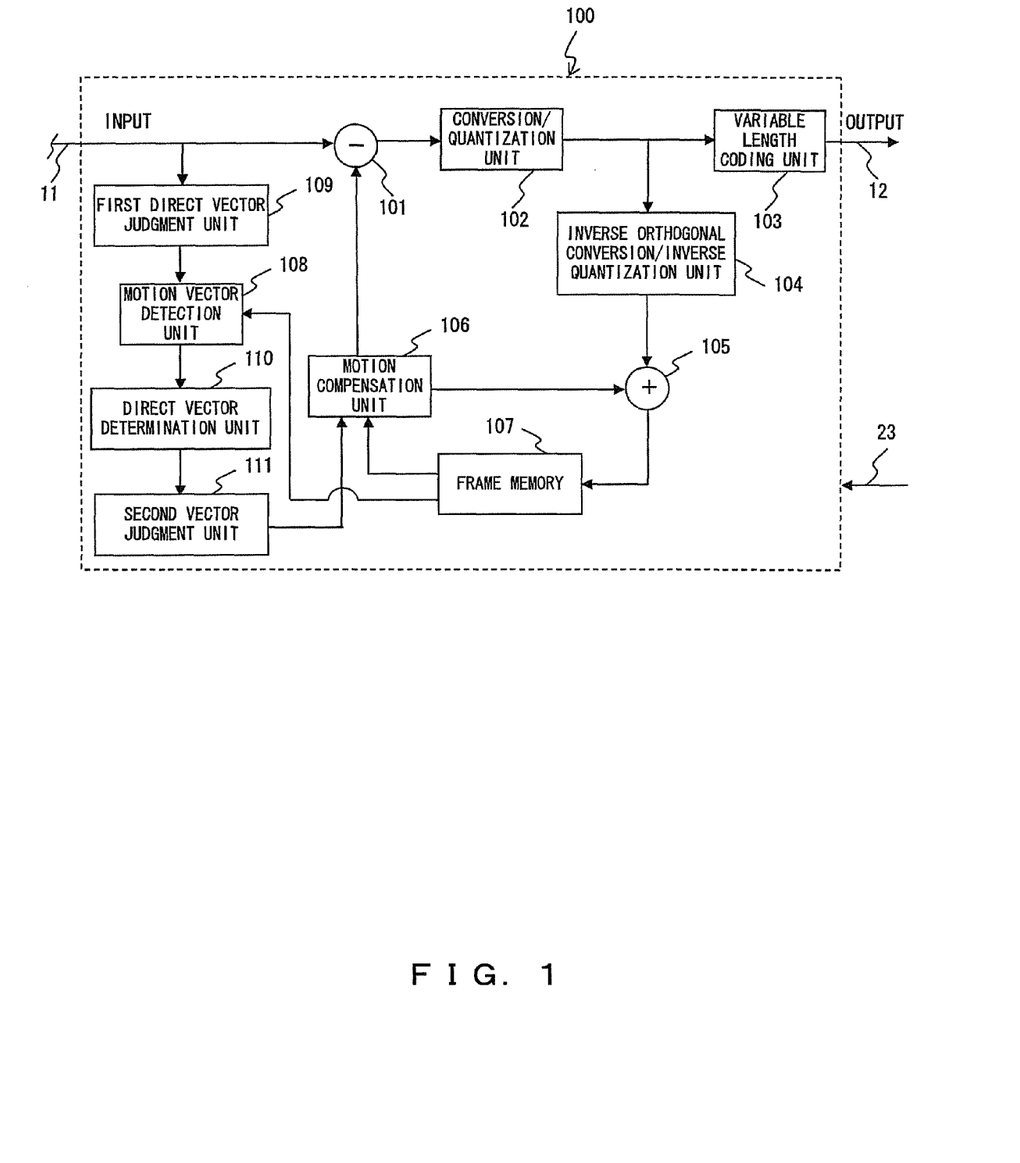
FIG. 1 is a conceptual diagram exemplifying a functional configuration of a video coding program embodying a video coding method according to an embodiment of the present invention.

FIG. 1 is a conceptual diagram exemplifying a functional configuration of a video coding program embodying a video coding method according to an embodiment of the present invention.

Figure 2:
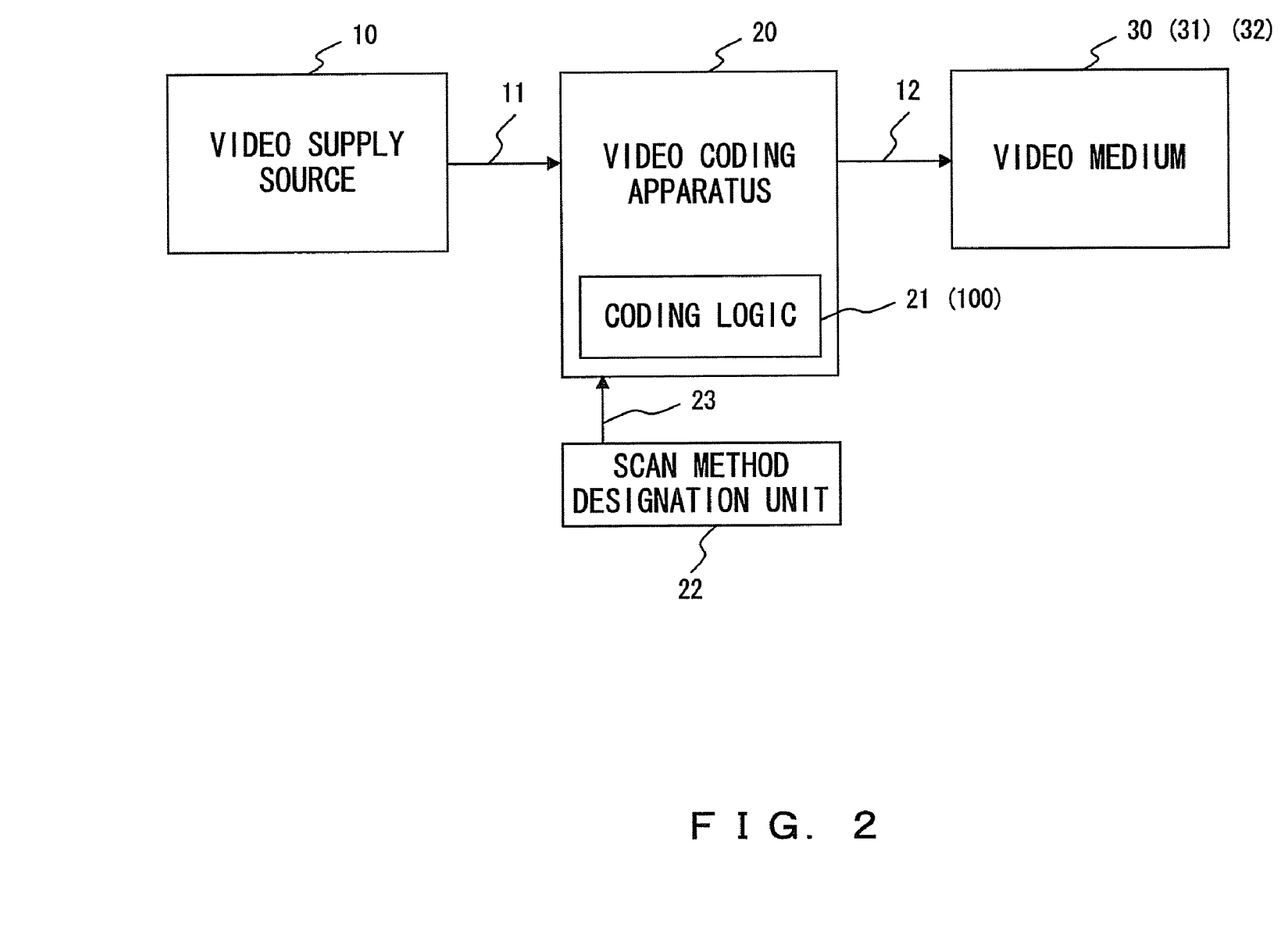
FIG. 2 is a conceptual diagram exemplifying a configuration of a video coding system including a video coding apparatus according to an embodiment of the present invention.

FIG. 2 is a conceptual diagram exemplifying a configuration of a video coding system including a video coding apparatus according to an embodiment of the present invention.

As exemplified by FIG. 2, a video coding system according to the present embodiment includes a video supply source 10, a video coding apparatus 20 and a video medium 30.

The video supply source 10 is, for example, a camera for photographing a video, or a tuner for receiving a broadcast of video data 11. The video supply source 10 outputs the video data 11 to the video coding apparatus 20.

The video coding apparatus 20, comprising coding logic 21, carries out a coding of the video data 11 by a later described video coding by using the coding logic 21 and outputs it as coded data 12.

The coding logic 21 may be implemented by a specific hardware circuit, or may be implemented by a computer (not shown herein), which is built within the video coding apparatus 20, executing a later described video coding program 100.

The video coding apparatus 20 receives an input of a scan method notification signal 23 from a scan method designation unit 22. The scan method notification signal 23 is a signal for designating that the video data 11 is either a video of a sequential scan forming one picture constituted by one field or that of a jump scan forming one picture constituted by two fields.

Note that the scan method notification signal 23 may be input from the video supply source 10 side.

The video medium 30 is constituted by an accumulation medium 31 or a communication medium 32, for example. The case of the accumulation medium 31 cumulatively retains the coded data 12 received from the video coding apparatus 20. The case of the communication medium 32 transfers the coded data 12 received from the video coding apparatus 20 to another place or apparatus.

As exemplified by FIG. 1, the video coding program 100 according to the present embodiment includes a differential operation unit 101, an orthogonal conversion/quantization unit 102, a variable length coding unit 103, an inverse orthogonal conversion/inverse quantization unit 104, an addition operation unit 105, a motion compensation unit 106, frame memory 107 and a motion vector detection unit 108, as functional blocks.

It further includes a first direct vector judgment unit 109, a direct vector determination unit 110 and a second vector judgment unit 111.

In the video coding program 100 according to the present embodiment, the video data 11 which is input from the video supply source 10 is processed by the unit of Macro Block. Since a differential coding is carried out except for an intra-Macro Block, the differential operation unit 101 first performs a subtraction for each pixel from a determined motion vector, a Macro Block pixel of a referred picture (i.e., a referred picture Macro Block size pixel at a position displaced from an original picture Macro Block position by the amount of a motion vector) and the current picture Macro Block pixel, thereby generating a differential image by the unit of Macro Block.

The differential image is processed by the orthogonal conversion/quantization unit 102 as follows.

The differential image is applied by an orthogonal conversion, such as a discrete cosine transform (DCT) conversion and a Hadamard conversion depending on a coding mode, et cetera per 8×8 pixel or 4×4 pixel, further followed by being converted to a frequency component signal. This is because a conversion to a frequency component collects signals in low frequency components, enabling an information volume compression due to a spatial correlation of an image.

A value after an orthogonal conversion is turned to a sample by the quantization unit, thereby further increasing the number of components whose coefficient being zero ("0") in the aforementioned value, resulting in outputting coefficients, which become non-zero, after they are coded by the variable length coding unit 103, as the coded data 12.

The variable length coding unit 103 basically allocates a shorter code to a combination of coefficients with a high frequency of appearances and a longer code to a combination of coefficients with a low frequency of appearances, and carries out an entropy coding which shortens an overall code length. H.264 enables a selection of a variable length code of a system called CAVLC and CABAC.

A post-quantization coefficient output from the orthogonal conversion/quantization unit 102 is converted into an image component by an inverse quantization and an inverse orthogonal conversion at the inverse orthogonal conversion/inverse quantization unit 104, thereby becoming a differential image by the unit of Macro Block, followed by being added to a referred image accumulated in the frame memory 107 by way of the addition operation unit 105 and generating a process image equivalent to the one at a decoding side (not shown herein) which is the output destination of the coded data 12.

The image generated by the inverse orthogonal conversion/inverse quantization unit 104, motion compensation unit 106 and addition operation unit 105, and then retained by the frame memory 107 is called a local decode image which is used for a differential coding of the next picture, and thereafter, coming as the video data 11.

The motion vector detection unit 108 performs a motion search by a block matching (i.e., a process for obtaining an accumulation value of a differential absolute value relating to each pixel between Macro Blocks of both images) between a reference image from the frame memory 107, as reference image, and the current image of the video data 11, and searches the most optimal motion vector from the minimum value, et cetera.

It is common to add an evaluation value of a motion vector in addition to a magnitude of a sum of differential absolute value of pixels for a motion search. Since a coding of a motion vector carries out a coding of a differential vector against a motion vector of peripheral Macro Block, not a component itself, the coding therefore obtains a differential vector and outputs an evaluation value equivalent to a motion vector code length depending on the size of the component.

Letting an evaluation value of a motion search be cost, a differential absolute value be SAD_cost (i.e., Sum Absolute Difference), an evaluation value equivalent to a code volume of a motion vector be MV_cost (Motion Vector), an expression:

$$cost=SAD\_cost+MV\_cost$$

searches a motion vector position minimizing the cost.

The first direct vector judgment unit 109 and second vector judgment unit 111 according to the present embodiment respectively determines a direct mode by the unit of picture and a direct mode by the unit of Macro Block.

The direct mode by the unit of picture includes two modes, i.e., a temporal direct mode and a spatial direct mode. A selection of the temporal direct mode in the case of a correlation of a motion being literary high in the temporal direction and a selection of the spatial direct mode in the case of a correlation of a motion being high in a spatial (i.e., within a picture) direction improve a coding efficiency.

The second direct vector judgment unit 111 by the unit of Macro Block evaluates whether or not a prediction image by using a direct vector generated by each Macro Block is an appropriate vector differentially between frames.

First, the direct vector determination unit 110 calculates a direct vector of the applicable Macro Block. This is generated by a scaling (i.e., a proportional division) according to a time-wise distance with a motion vector of the co-location Macro Block of a Col-Pic as a mvCol in the case of the temporal direct mode. In the case of the spatial direct mode, it is generated by the intermediate value of a motion vector of peripheral Macro Blocks which are already processed within the same picture.

The second direct vector judgment unit 111 obtains an evaluation value (cost) of a motion search by the determined direct vector, determines a selection or not selection of a later described direct mode according to the present embodiment and performs a weighting process, thereby controlling an ease of a direct mode being selected (i.e., a possibility of being selected) for each Macro Block.

Figure 3:
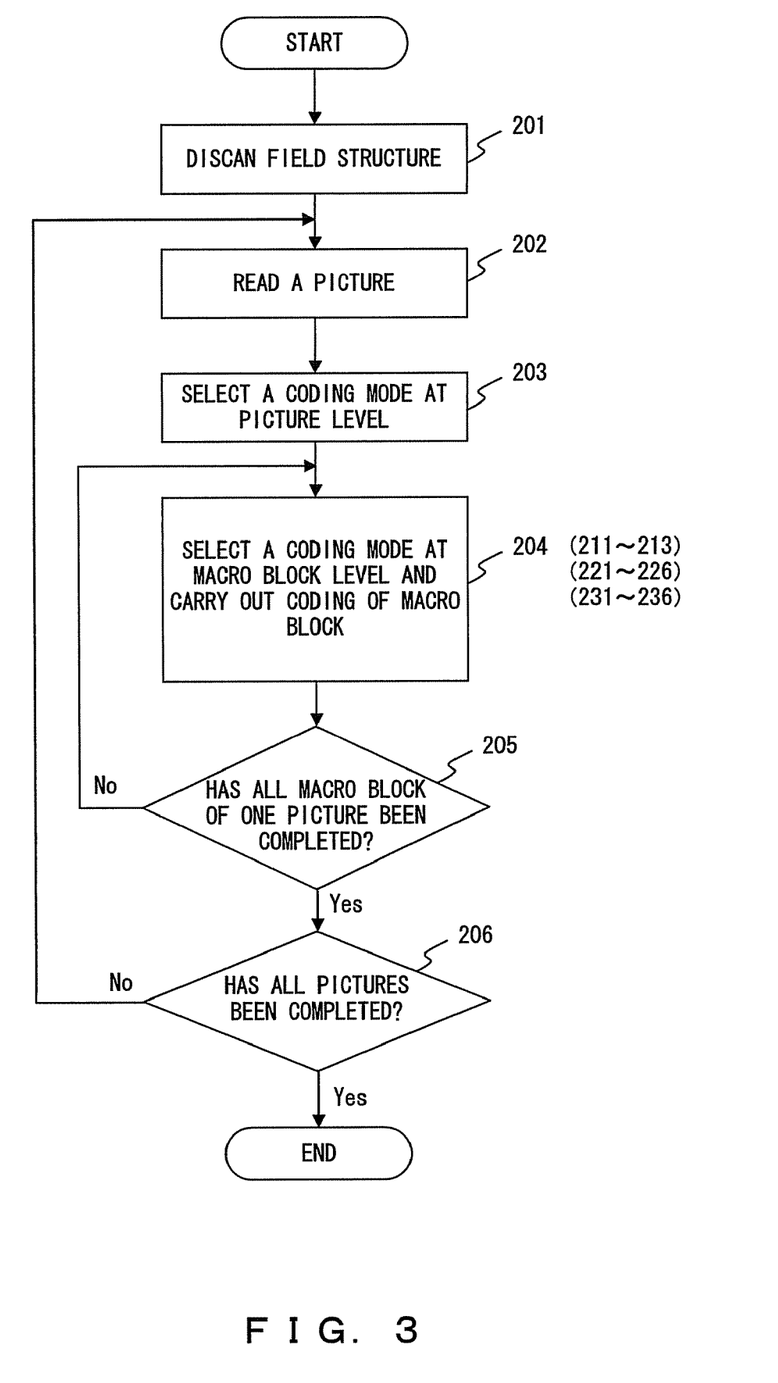
FIG. 3 is a flow chart describing an overall operation example of a video coding program according to an embodiment of the present invention.

Now the description is of an overall operation of the video coding program 100 according to the present embodiment by referring to the flow chart shown in FIG. 3.

First, the program discerns whether or not a single picture has a Frame structure constituted by a plurality of Frames (i.e., whether or not it is a jump scan image) by the scan method notification signal 23 (step 201), followed by reading one screen image (i.e., one picture) from the video data 11 (step 202).

Then the first_direct vector judgment unit 109 selects a coding mode on the picture level (step 203).

Then, the second direct vector judgment unit 111 determines whether or not to carry out the coding mode which is selected at the picture level for the Macro Block level, followed by carrying out a coding of the Macro Block by using the eventually selected coding mode (step 204).

The program repeats the processes of the steps 204 and 205 for all the Macro Blocks within the current picture (step 205) and further repeats the steps 202 through 205 for all the pictures of the video data 11 (step 206).

Coding Control Example 1

The next is a detailed description of an example operation at the first direct vector judgment unit 109 in the above described step 203.

The first direct vector judgment unit 109 changes the mvCol of a motion vector of a direct mode by the unit of picture as described later in order to improve a prediction efficiency, thereby avoiding problems such as a degradation of accuracy and an inability of selecting the temporal direct mode, et cetera, in the case of a Field structure (i.e., a jump scan image).

The following operation is required only for a Bottom field of an I- and a P-Pictures in the case of a Field structure.

FIG. 11 shows the case of applying the temporal direct mode if each picture 11a of the video data 11 has a Field structure constituted by a top field 11b (i.e., a field including scanning lines of odd numbers) and a Bottom field 11c (i.e., a field including scanning lines of even numbers).

The coding sequence of each Field, picture type (P types: I (Intra Picture), P (Predictive Picture), B (Bi-predictive Picture)) and reference numbers (Ref_idx) of the List0 and List1 are described in the upper part of FIG. 11, and the corresponding individual pictures are shown, by vertical lines, in the display (i.e., photographed) time sequence from the left to right, in the lower part of the drawing.

When carrying out a coding of the coding target bottom field 11c (i.e., Current) by the temporal direct mode, a mvCol is set between a datum, which is established at the bottom field 11c (i.e., Col-Pic; whose coding sequence=3) that has already been coded before and whose display sequence is the immediate future, and the Top field 11b (whose coding sequence=2) as the target of a reference.

Then, a direct vector 1 and a direct vector 2 as motion information are set for the Bottom field 11c and Top field 11b with the Bottom field 11c (i.e., Current) being the start point.

That is, since the Bottom field 11c and Top field 11b which are reference targets in the temporal direct mode exist as biased to the future direction from the view of the Bottom filed 11c (i.e., Current) as the target of a coding in the example of FIG. 11, the mvCol is far smaller than the direct vector 0 and direct vector 1.

As such, if the direct vectors 0 and 1 (i.e., motion vectors) of the Co-location Macro Block point at opposite parity (i.e., the Top field 11b and Bottom field 11c) within the same frame (i.e., the picture 11a) in the Field structure, the direct vector 1 becomes three times the mvCol, and the direct vector becomes four times the mvCol, and thus the generation accuracy of the motion vector becomes coarser as that much.

In such a case as FIG. 11, the first direct vector judgment unit 109 changes over the allocation of Ref_idx of List0 (refer to FIG. 4) to change (operate) the mvCol for selecting the temporal direct mode so as to enable a generation of the direct vectors 0 and 1 by an internal division of the mvCol.

Figure 4:
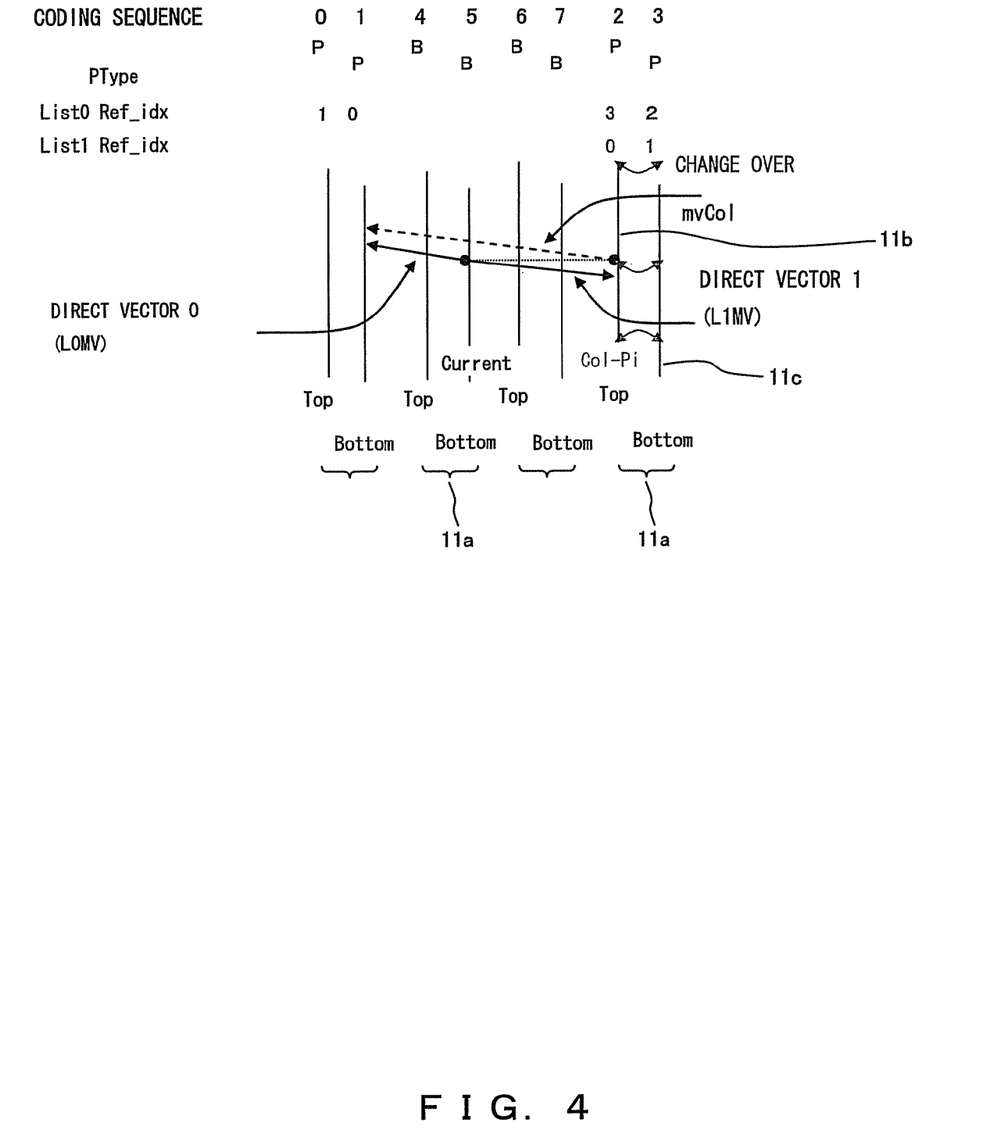
FIG. 4 is a conceptual diagram showing an operation of the embodiment of the present invention.

By so doing, the reference target of the Top field 11b (i.e., Col-Pic, whose coding sequence=2) after the changeover becomes the Bottom field 11c (whose coding sequence=1) as exemplified in FIG. 4, and therefore the mvCol originating and terminating at both of the aforementioned fields becomes a vector straddling the Current picture, thereby avoiding a bad influence of a degradation of accuracy of the direct vectors 0 and 1.

Figure 5:
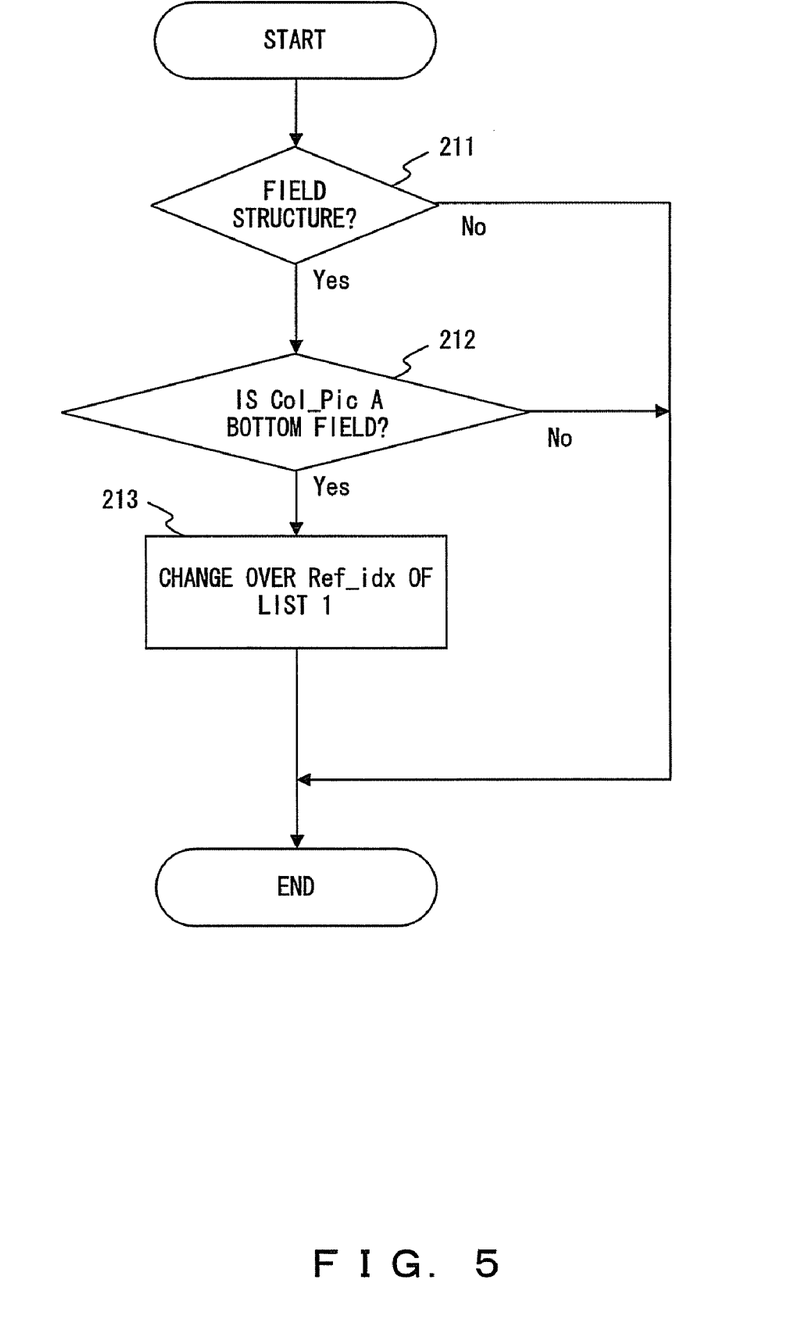
FIG. 5 is a flow chart showing an operation of the embodiment of the present invention.

FIG. 5 shows a flow chart of the above described changeover process at the first direct vector judgment unit 109. The flow chart shown by FIG. 5 exemplifies a detailed process carried out by the first direct vector judgment unit 109 in the step 203 as described above in association with FIG. 3.

That is, to begin with, the first direct vector judgment unit 109 discerns based on information of the scan method notification signal 23, et cetera whether or not the current picture has a Field structure (step 211).

In the case of the Field structure, it discerns whether or not the Col_Pic establishing the starting point of the mvCol is a Bottom Field 11c and, if it is the Bottom Field 11c, the first direct vector judgment unit 109 changes over Ref_idx of List1 (step 213).

In the case of not a Field structure in the above described step 211 and of the reference picture not being a Bottom Field 11c in the above described step 212, a picture as the target of a reference is not changed over because a problem such as the above described FIG. 11 does not occur.

As described above, in the case of the coding control example 1, if the direct vectors 0 and 1 are relatively large as compared to the mvCol and there is accordingly a concern over accuracy of a motion vector being degraded because the reference picture for the direct mode exists by biased toward the past or future direction vis-à-vis the Current picture as the target of a coding, the first direct vector judgment unit 109 changes over Ref_idx of List1 of the picture (i.e., the Field) as the target of a reference, thereby avoiding a degradation of accuracy of the motion vector obtained from the direct vector 0 and direct vector 1.

That is, it is possible to achieve a high compression ratio by adopting the direct mode without causing an image quality degradation.

It is also possible to solve the problem of not being able to accomplish a direct mode due to a positional relationship between the Current picture as the target of coding and a picture (i.e., a Field) as the target of a reference by changing over Ref_idx of List1 of the picture as the target of a reference.

Coding Control Example 2

In the coding control example 2, the description is of a countermeasure for not causing an occurrence of a direct mode. Also the case of the coding control example 2 is a countermeasure in the case of direct vectors 0 and 1 being generated by an external division of the mvCol as shown in FIG. 11.

In FIG. 11, the mvCol of the co-location Macro Block of a Col-Pic points at a opposite parity (i.e., a Top Field 11b) within the same frame, this Macro Block, however, actually is also capable of generating a motion vector by referring to a co-location Macro Block of a Field (whose coding sequence=1) of Ref_idx of List0. In such a case, calculated direct vectors 0 and 1 per se are generated by an internal division of the mvCol, and therefore do not create a problem in terms of a vector accuracy.

Accordingly, an adopted countermeasure is not to let a direct mode occur only in the case of a mvCol existing biased toward the past or future temporal direction with the Current being the datum as shown in FIG. 11.

That is, it becomes a changeover process by the unit of Macro Block, and therefore the second direct vector judgment unit 111 exemplified in FIG. 1 makes judgment.

Figure 6:
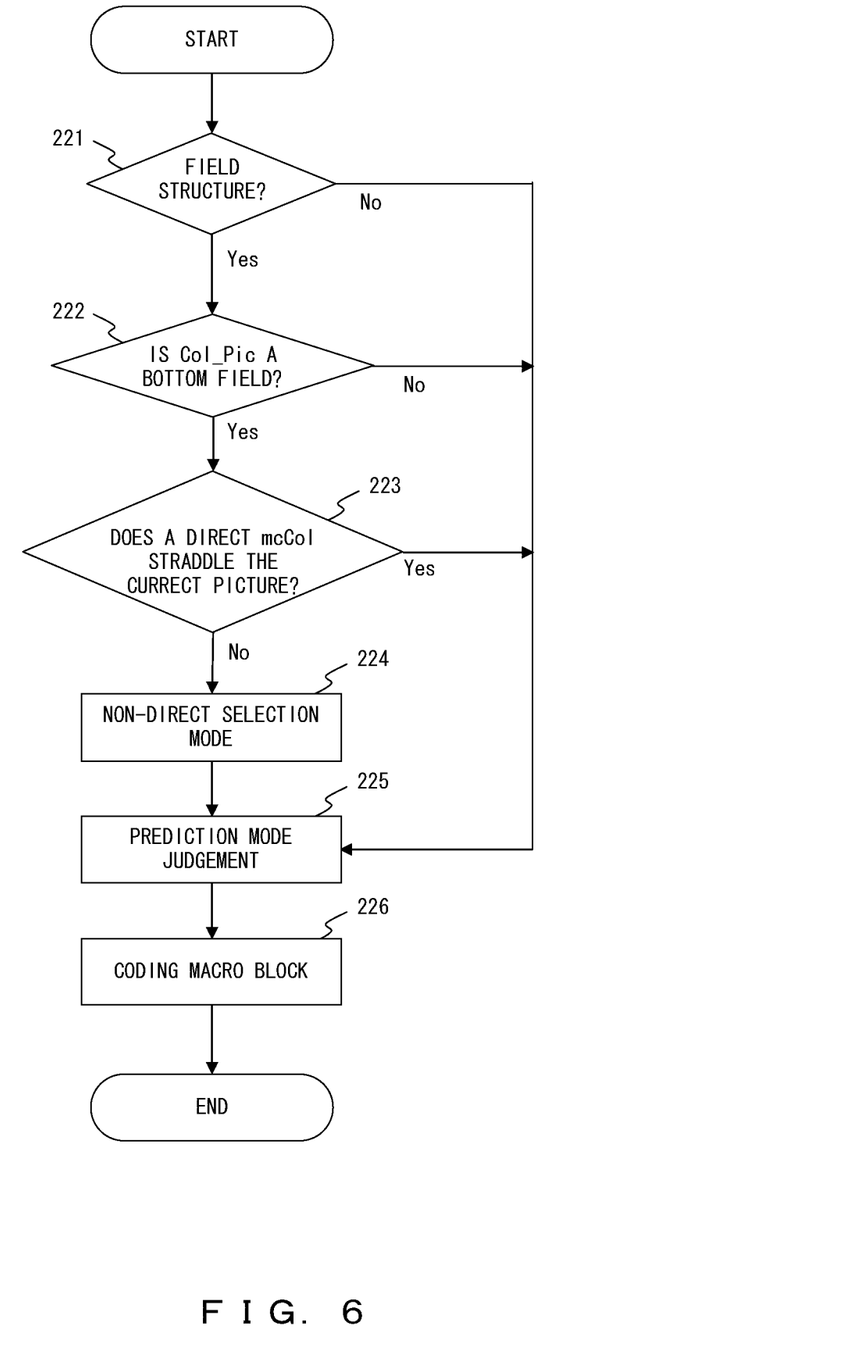
FIG. 6 is a flow chart showing a modified example of an operation of the embodiment of the present invention.

FIG. 6 shows a flow chart of this operation. The FIG. 6 exemplifies a further detail of the step 204 in the above described FIG. 3.

That is, in the case of the Current picture to which the current Macro Block belongs having a Field structure (step 221) and also a picture of Ref_idx=0 of List 1 as the target of a reference being a Bottom Field 11c (step 222), the second direct vector judgment unit 111 discerns whether or not the mvCol of the direct mode straddles the Current picture in the direction of the time axis (step 223).

Then, if the mvCol is judged not to straddle the Current picture in the direction of the time axis (i.e., the state of FIG. 1), it does not select a direct mode for the current Macro Block (step 224), selects another coding mode (step 225) and carries out a coding of the current Macro Block (step 226).

In the case of the coding control example 2, it is possible to firmly prevent an image quality degradation of a prediction image by avoiding an adoption of the direct mode if an image quality degradation due to an accuracy deterioration of a motion vector based on direct vectors 0 and 1 which are generated from the mvCol in the direct mode is predicted.

Coding Control Example 3

A coding control example 3 is configured to make it difficult to select a direct mode if a degradation of accuracy is predicted as in the case of FIG. 11 in judging as to which predictive coding mode, i.e., a direct mode or another predictive coding mode, is to be selected.

That is, the above described coding control example 2 is configured to control so as not to select a direct mode at all in a case applicable to a condition where there is a risk of a degradation of accuracy as exemplified by FIG. 11.

Comparably, the present coding control example 3 is configured to analyze a condition quantitatively in greater details and applies a weighting to criteria for selecting a direct mode so as to make it difficult to select it in a case applicable to the condition where there is a risk of a degradation of accuracy as exemplified by FIG. 11.

Actual predictive modes of a Macro Block include various methods for predicting at a Macro Block level such as intra-prediction, forward prediction, backward prediction, bi-direction prediction and direct mode (which includes a temporal direct mode and a spatial direct mode as noted above, and accordingly the configuration is to compare a predictive evaluation value (i.e., a magnitude of a predictive error) for each of these prediction method, and make it difficult to select a direct mode when selecting as to which of the modes is most optimal.

The following expressions exemplify a calculation method of a predictive evaluation value.

$$\text{cost\_direct} = SAD(*org, *ref) \quad \text{[Expression 1]}$$

$$\text{cost\_forward} = SAD(*org, *ref) + MV\_COST(*mv, *prevmv) \quad \text{[Expression 2]}$$

$$\text{cost\_backward} = SAD(*org, *ref) + MV\_COST(*mv, *prevmv) \quad \text{[Expression 3]}$$

$$\text{cost\_bidirection} = SAD(*org, *ref) + MV\_COST(*mv, *prevmv) \quad \text{[Expression 4]}$$

$$\text{cost\_intra} = ACT(*org) \quad \text{[Expression 5]}$$

A cost of a direct mode (cost_direct) is obtained by the expression 1.

A cost of a forward prediction mode (cost_forward) is obtained by the expression 2.

A cost of a backward prediction mode (cost_backward) is obtained by the expression 3.

A cost of a bi-direction prediction mode (cost_bidirection) is obtained by the expression 4.

A cost of an intra-prediction mode (cost_intra) is obtained by the expression 5.

In the expressions 1 through 5, *org is information of an original picture Macro Block, *ref is information of a reference picture Macro Block. The *mv and *prevmv indicate a motion vector of each of the original picture Macro Block and reference picture Macro Block, respectively.

The function SAD ( ) within the expression 4 is for figuring out a sum of pixel differential absolute values within a Macro Block which is the function for obtaining a sum of differential absolute values of 16×16 pixels of the original picture Macro Block and of reference picture Macro Block in this case. The expression 6 is an example:

$$SAD(\ ) = \Sigma |*org - *ref| \quad \text{[Expression 6]}$$

Actually, a Macro Block can be divided into a plurality thereof within one Macro Block and therefore, if one Macro Block is divided into four sub-Blocks of 8×8, a congregation of four sums of differential absolute values of 8×8=64 pixels constitutes an SAD evaluation value.

Incidentally, various sizes of sub-Blocks exist, such as 8×16, 16×8, 4×8, 8×4 and 4×4, in addition to 16×16 and 8×8.

The case of an intra-prediction carries out a coding of an original image per se in place of a differential image and accordingly uses another evaluation value called an activity (i.e., the ACT ( ) in the expression 5).

The case of the intra-prediction applies an orthogonal conversion to an original picture Macro Block per se and accordingly calculates the function ACT ( ) by a displacement from a Macro Block average (=Ave MB) of each pixel of the Macro Block as shown in the expression 7, or other methods.

$$ACT(\ ) = \Sigma |*org - AveMB| \quad \text{[Expression 7]}$$

The function MV_COST of the expressions 2 through 4 outputs an evaluation value in proportion to a code volume of a motion vector as shown in the expression 8. Specifically, a differential vector vis-à-vis a peripheral Macro Block is coded for a motion vector, in lieu of the component itself, and therefore an evaluation value is determined from a size of the absolute value. Also commonly used is a method, using a weighting constant λ, for changing a degree of influence to an overall cost evaluation value of the MV_COST ( ).

$$MV\_COST = \lambda * (Table[*mv - *premv]) \quad \text{[Expression 8]}$$

In the expression 8, the Table [ ] is a conversion table for converting a size of a vector difference to an equivalence of a coding volume.

Here, there are various conceivable methods for setting a weighting actually and intentionally.

For instance, a conceivable method is to add a fixed value such as a weighting constant W to a cost_direct which has been obtained as described above.

Or, another possible method is to multiply the cost_direct by a constant, i.e., a predefined weighting coefficient α.

An actual prediction mode judgment by using a thusly obtained cost of each prediction mode calculates a minimum evaluation cost, as min_cost, by using a minimum value judgment function min ( ) such as the expression 9 and determines a prediction mode applicable to the min_cost as a Macro Block type (i.e., MB_Type) to be used for coding a Macro Block.

$$min\_cost = min(cost\_direct, cost\_forward, cost\_backward, cost\_bidirection, cost\_intra) \quad \text{[Expression 9]}$$

Figure 7:
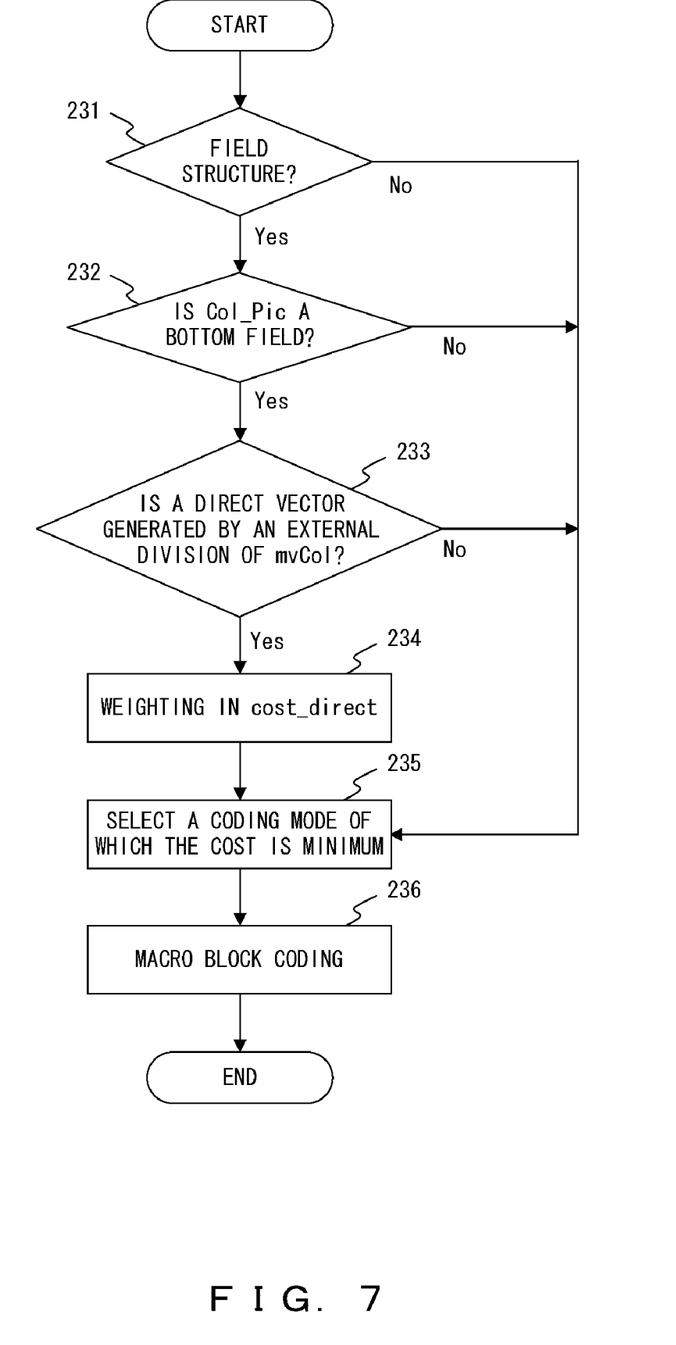
FIG. 7 is a flow chart showing a modified example of an operation of the embodiment of the present invention.

FIG. 7 shows a flow chart of the above described weighting evaluation.

The FIG. 7 exemplifies the step 204 shown in the above described FIG. 3 in greater details.

That is, in the case of the Current picture to which the current Macro Block belongs having a Field structure (step 231) and also a picture of Ref_idx=0 of List1 as the target of a reference being a Bottom Field 11c (step 232), a judgment is made as to whether or not the mvCol straddles the Current picture in the direction of a time axis (step 233).

And, if the mvCol is judged to not straddle the Current picture in the direction of the time axis, that is, if a direct vector is generated by an external division of the mvCol in the condition of FIG. 11, a weighting is applied to the cost (i.e., the cost_direct) in the direct mode relating to the Current Macro Block (step 234).

Then, a coding mode of which the cost applicable to the min_cost is a minimum is selected (step 235) and a coding of the Current Macro Block is carried out (step 236).

Note that a configuration may be such as to select, in lieu of the temporal direct mode, the spatial direct mode in higher priority than another coding mode other than a direct mode in the step 235.

The coding control example 3 is configured to control so as to lower a ratio of selecting a direct mode in comparing a direct mode with another coding mode in the case of a degradation of an image quality due to decreased prediction accuracy of a motion vector being predicted in the direct mode, thereby enabling an accomplishment of various coding in consideration of a balance among an improvement of a compression ratio by adopting a direct mode and a degradation of an image quality.

Note that the present invention can apparently be changed in various ways possible within the scope thereof, in lieu of being limited by the configurations exemplified in the above described embodiments.

The present invention is contrived to enable an accomplishment of an improvement of compression efficiency by virtue of a direct mode without causing a degradation of an image quality in a video coding.

It also accomplishes an improvement of prediction efficiency, coding efficiency and resultant compression efficiency as a result of adopting a direct mode without being influenced by a scanning system of a video in a video coding.

It also accomplishes an improvement of prediction efficiency, coding efficiency and resultant compression efficiency by virtue of increasing a frequency of selecting a direct mode as a result of adopting a direct mode in a video coding.

What is claimed is:

1. A video coding method, performed by a computer, which includes, as one of a plurality of coding modes, a direct mode generating a piece of motion information of each of Macro Blocks, which are obtained by dividing a first picture, by predicting from motion information of a coded Macro Block of other plurality of second pictures, including:
   a first step for selecting the direct mode as the coding mode by using a variable selection criterion; and
   a second step for coding the Macro Blocks based on the selected coding mode, wherein,
   in the case that said direct mode is a temporal direct mode which generates two direct vectors originating from said Macro Block, as said motion information, by dividing a mvCol originating from and terminating at coded two Macro Blocks in a plurality of said second pictures corresponding to the Macro Block proportionally by a time interval between said first picture and each of the second pictures, that
   each of said picture is constituted by a first and a second fields, and that said second step carries out a coding of the field as one picture,
   said first step changes the mvCol by changing the second picture (ColPic) as the target of a reference if the second field of the second picture becomes the origination point of the mvCol.

2. The video coding method according to claim 1, wherein said first step selects said coding mode per said first picture or per said Macro Block.

3. The video coding method according to claim 1, wherein,
   in the case of said direct mode being a temporal direct mode which generates two direct vectors originating from said Macro Block, as said motion information, by dividing a mvCol originating from and terminating at coded two Macro Blocks in a plurality of said second pictures corresponding to the Macro Block proportionally by a time interval between said first picture and each of the second pictures;
   said first step does not select the direct mode if the direct vector becomes larger than the mvCol.

4. The video coding method according to claim 1, wherein,
   in the case of said direct mode being a temporal direct mode which generates two direct vectors originating from said Macro Block, as said motion information, by dividing a mvCol originating from and terminating at coded two Macro Blocks in a plurality of said second pictures corresponding to the Macro Block proportionally by a time interval between said first picture and each of the second pictures;
   said first step suppresses an occurrence of the direct mode if the direct vector becomes larger than the mvCol.

5. The video coding method according to claim 1, wherein, in the case that said direct mode is
   a temporal direct mode which generates two direct vectors originating from said Macro Block, as said motion information, by dividing a mvCol originating from and terminating at coded two Macro Blocks in a plurality of said second pictures corresponding to the Macro Block proportionally by a time interval between said first picture and each of the second pictures, that each of the pictures is constituted by a first and a second fields and that said second step carries out a coding of the fields as one picture;

said first step selects said temporal direct mode only if the mvCol is zero vector, if the second field of the second picture constitutes the origination point of the mvCol.

6. The video coding method according to claim 1, wherein said first picture is a Bi-predictive Picture (B-Picture), and said second picture is an Intra Picture (I-Picture) or a Predictive Picture (P-Picture) in the case of applying to H.264/AVC (Advanced Video Coding).

7. A video coding method, performed by a computer, which includes, as one of a plurality of coding modes, a direct mode generating a piece of motion information of each of Macro Blocks, which are obtained by dividing a first picture, by predicting from motion information of a coded Macro Block of other plurality of second pictures, including:

a first step for selecting the direct mode as the coding mode by using a variable selection criterion; and a second step for coding the Macro Blocks based on the selected coding mode, wherein, in the case that said direct mode includes a temporal direct mode which generates two direct vectors originating from said Macro Block, as said motion information, by dividing a mvCol originating from and terminating at coded two Macro Blocks in a plurality of said second pictures corresponding to the Macro Block proportionally by a time interval between said first picture and each of the second pictures and a spatial direct mode which generates motion information of said Macro Block from a mvCol originating from and terminating at coded two Macro Blocks in a plurality of said second pictures corresponding to the Macro Block and from a coded motion vector within the first picture, that each of the pictures is constituted by a first and a second fields, and that said second step carries out a coding of the fields as one picture, said first step carries out a coding of the Macro Block by selecting the spatial direct mode if the second field of the second picture constitutes the originating point of the mvCol.

\* \* \* \* \*